United States Patent [19]
Ambrose

[11] 3,833,454
[45] Sept. 3, 1974

[54] REINFORCED FOAM PLASTIC SEAT BUN AND METHOD OF MOLDING SAME

[75] Inventor: Jere B. Ambrose, Pontiac, Mich.

[73] Assignee: Northern Fibre Products Company, Birmingham, Mich.

[22] Filed: May 11, 1972

[21] Appl. No.: 252,486

[52] U.S. Cl................ 161/159, 161/155, 5/345 R, 5/355, 297/452, 297/458, 297/DIG. 1, 297/DIG. 2, 264/45
[51] Int. Cl......................... B32b 3/26, A47c 7/02
[58] Field of Search.......... 264/45; 161/159, 88, 92, 161/160, 161, 190; 156/78, 79; 297/195, 198, 216, 229, 252, 455, 456, 457, 458, DIG. 1, DIG. 2, 452; 5/345 R, 355

[56] References Cited
UNITED STATES PATENTS

| | | | |
|---|---|---|---|
| 3,084,980 | 4/1963 | Lawson | 297/DIG. 1 |
| 3,188,665 | 6/1965 | Snyder | 297/452 |
| 3,223,576 | 12/1965 | Evans et al. | 264/45 |
| 3,580,763 | 5/1971 | Criner et al. | 161/159 |
| 3,597,297 | 8/1971 | Buchholtz | 161/190 |
| 3,616,171 | 11/1971 | Hoskinson, Sr. | 297/DIG. 2 |
| 3,637,456 | 1/1972 | Mao | 161/159 |
| 3,647,607 | 3/1972 | Hillers | 161/159 |
| 3,663,973 | 5/1972 | Spence | 5/355 |
| 3,748,217 | 7/1973 | May et al. | 161/159 |

Primary Examiner—George F. Lesmes
Assistant Examiner—Stanley S. Silverman
Attorney, Agent, or Firm—Cullen, Settle, Sloman & Cantor

[57] ABSTRACT

A molded foam plastic seat bun formed into a cushion shape and having a lower face for resting upon a spring support means, with a preformed, thin sheet of non-woven, randomly oriented fibrous fabric formed of linearly oriented, polypropylene fibers bonded together in relatively spaced apart relationship to provide randomly located openings between the fibers through the sheet, and the sheet being stretch resistant in its planar directions, with the sheet being embedded within the lower face portion of the bun a slight distance above the lower face surface and with foam plastic material extending through the sheet openings and forming a thin coating over its lower face.

2 Claims, 9 Drawing Figures

PATENTED SEP 3 1974 3,833,454

REINFORCED FOAM PLASTIC SEAT BUN AND METHOD OF MOLDING SAME

BACKGROUND OF INVENTION

Seat buns used as cushions for automotive vehicle seats and furniture seats are conventionally molded out of a foam rubber-like plastic, such as foamed polyurethane materials, into a cushion formation. Upholstery material is stretched around and secured to the bun which is then rested upon the spring seat support portion.

Because of the constant resilient flexing, compression and expansion, etc., of the bun material during use of the seat, the bun tends to loose its shape and particularly tear or crumble or flake apart at its lower surface due to the immediate pressure and contact with the seat springs or spring support.

Attempts have been made in the past to apply a reinforcing material, particularly burlap or the like woven materials to the bun for reinforcement, but generally, these have been unsatisfactory in use over a long period of time. Such materials have generally deteriorated over a period of time and moreover have been unable to resist, for long periods of time, the constant flexing and movement of the seat bun.

Thus, the invention herein relates to an improvement in seat buns utilizing in combination with the foamed bun an improved material embedded within the lower surface of the bun.

SUMMARY OF INVENTION

The invention herein relates to a seat bun molded into a cushion formation made of foamed rubber-like plastic materials and having embedded within its lower surface, just beneath the surface, a preformed thin sheet of non-woven, randomly oriented, spaced apart fibrous fabric made of fine fibers of linearly oriented polypropylene. The sheet is initially positioned upon a wall of the mold within which the bun is formed and during the molding and foaming of the plastic material, the plastic leaks through the spaces between the fibers and between the sheet and the mold wall to which it is affixed, thereby coating the exposed surface of the sheet and embedding it a slight distance below the bun surface. The surface within which the sheet is embedded then forms the lower support surface of the bun for resting upon the seat spring support.

Such material is highly stretch resistant in all of its planar directions and although flexible, is relatively stiff so that the feel of the bun or cushion is relatively unchanged, but the performance of the bun is substantially improved in that it will not rapidly lose its shape, crumble or otherwise deteriorate.

These and other objects and advantages will become apparent, upon reading the following description, of which the attached drawings form a part.

DETAILED DESCRIPTION

Figure 1:
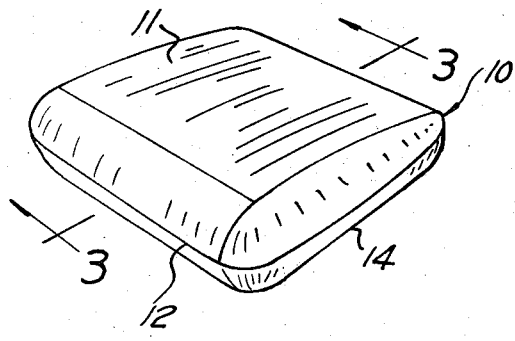
FIG. 1 is a perspective view of a seat bun used in an automobile type "bucket" seat.
Figure 2:
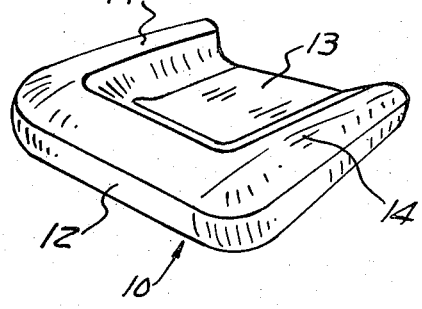
FIG. 2 is a perspective view of the bun turned upside down, that is, looking at its lower surface.
Figure 3:
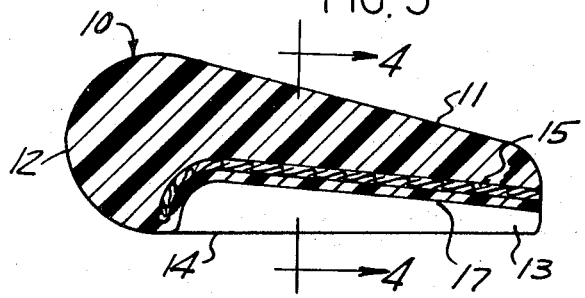
FIG. 3 is an enlarged cross-sectional view taken in the direction of arrows 3—3 of FIG. 1.
Figure 4:
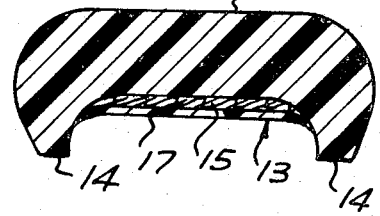
FIG. 4 is a cross-sectional view taken in the direction of arrows 4—4 of FIG. 3.
Figure 5:
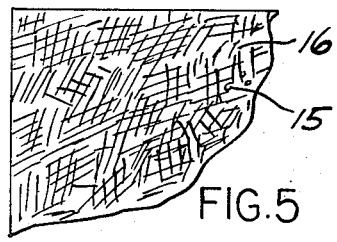
FIG. 5 is an enlarged fragment of the sheet.
Figure 6:
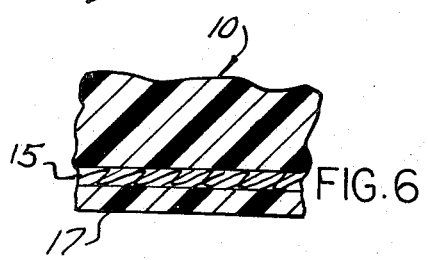
FIG. 6 is an enlarged cross-sectional view of a fragment of the composite bun and sheet.

FIG. 1 illustrates a foamed rubber-like seat bun 10 which may be made of a foamed plastic, such as polyurethane or the like. The bun has an upper seat surface 11, a forward edge portion 12 and a depressed or indented lower surface 13 formed to rest upon the conventional springy seat support used in automotive type seating. The spring support is omitted here as it is conventional and forms no part of the invention.

As is usual, the lower portion of the bun is formed with side beads or ridges 14 which fit around the sides of the springy seat support. Of course, the bun may be molded in various contour shapes for different design purposes as required, with the illustrated shape being shown for representative purposes.

The invention herein relates to the reinforcing sheet 15 sometimes referred to as an "insulator" which is embedded within the bun, closely adjacent to its exposed lower support surface 13. This sheet is preformed or cut to correct size, out of a non-woven, randomly oriented fibrous fabric. The fibers are preferably of short lengths, e.g., two-five inches in length and made of fine strands (e.g., 0.001–0.003 inches diameter) of linearly oriented or stretched, polypropylene plastic. The fibers are loosely felted and bonded together at their intersections in such a way as to provide spaces around the fibers which extend through the sheet. In effect, the sheet is provided with randomly located passageways around the fibers.

The fabric is lightweight and thin, such as in the order of 10–13 mils in thickness and approximately in the range of 2 ounces per square yard in weight. The finished fabric is relatively smooth surfaced and is characterized by being relatively stiff, e.g., preferably much stiffer than comparable woven cotton cloth or plastic fibrous cloth, but still flexible. Such fabric is highly stretch resistant in all of its planar directions and has a memory tendency to remain flat or to retain the shape into which it is heat molded.

The sheet is embedded within the bun so that plastic material extends through and around its fibers 16 and forms a lower, thin, even coating or layer 17 on the bottom surface of the bun, below the sheet. Thus, the sheet is embedded just inwardly of the bottom surface of the bun.

Figure 8:
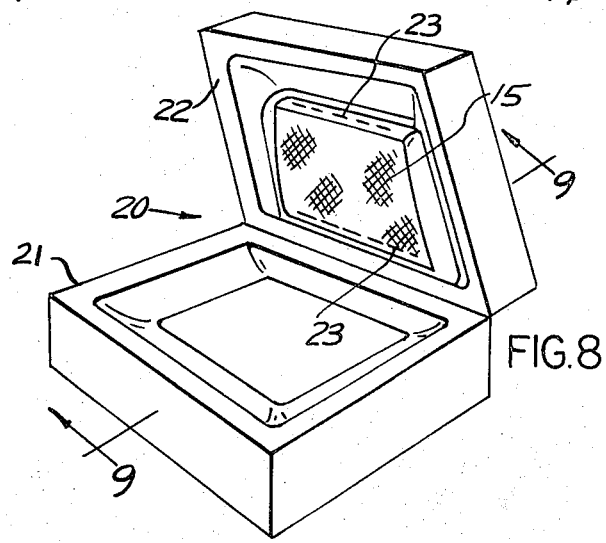
FIG. 8 is a perspective view of a mold within which the bun is formed.
Figure 9:
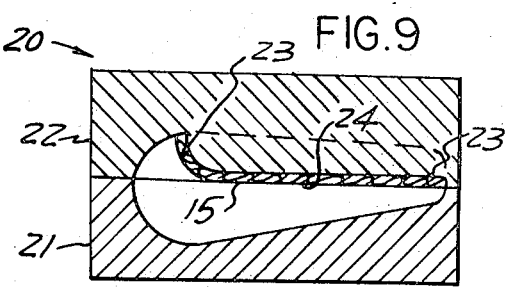
FIG. 9 is a cross-sectional view taken in the direction of arrows 9—9 of FIG. 8 of the mold closed with the sheet positioned on the wall thereof.

FIGS. 8 and 9 illustrate a typical molding apparatus, illustrated schematically and generally comprising a mold 20 within which the bun is molded or formed. The mold cavity is inverted so that the bun is formed upside down. Thus, the lower mold half 21 molds the upper half of the bun and the upper mold half 22 molds the lower half of the bun.

Figure 7:
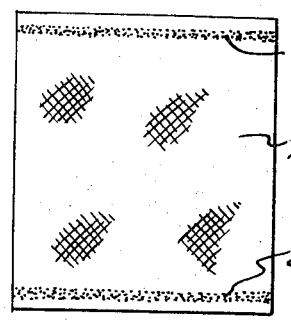
FIG. 7 is a plan view, to reduced size, of the preformed sheet prior to molding.

In the process of forming the bun, first the sheet 15 is preformed to size and preferably is provided with stripes or spots of adhesive 23 (see FIG. 7) in selected locations. This may be of the permanently tacky type of adhesive or of a heat or liquid actuatable type.

The preformed sheet is inserted within the mold and applied to the applicable mold wall portion 24 (see FIG. 8).

Thereafter, the raw plastic material is inserted in the mold and the mold is closed with a following application of the suitable amount of heat for causing the plastic material to foam and to mold to shape. During the time that the mold is closed and the foaming and molding takes place, the plastic material seeps around the fibers of the sheet and through the openings between the fibers so as to flow between the sheet and the wall portion 24 upon which the sheet is applied. Thus, the sheet becomes embedded within the bun with a thin coating, roughly around the same thickness as the sheet or perhaps slightly more, coating the lower exposed surface of the sheet.

After the mold is open, and the bun, with the embedded sheet is removed, the bun may then be handled in the usual way, by applying upholstery material to it and then ultimately resting it upon and securing it to the conventional springy seat supports, such as the type used on automotive "bucket" seats. During the upholstery process and the handling of the bun, it is highly resistant to tearing or crumbling and is stiffened by the cloth to a degree where the upholstery fabric may be readily applied without distorting the bun.

Having fully described an operative embodiment of this invention, I now claim:

1. A seat bun formed of molded foamed plastic material shaped into seat cushion form having an upper seat surface, a forward edge portion and a recessed lower face upon which the bun is supported upon a support means, comprising:

a thin, relatively lightweight, sheet of non-woven randomly oriented fabric formed of linearly oriented polypropylene fibers bonded together with the fibers spread apart sufficiently to form randomly located fine openings therebetween through the sheet, and the sheet being characterized by being relatively smooth surfaced, flexible, but relatively stiff, and stretch resistant in all of its planar directions;

said sheet for reinforcing the foamed plastic material against crumbling and tearing, and being of substantially the same configuration as said recessed lower face and embedded within the foamed plastic material just above the recessed lower face with the foamed plastic material extending through the fine, random sheet openings and coating the side of said sheet closer to said recessed lower face, said coating of a thickness roughly around the thickness of the sheet itself.

2. A seat bun comprising:

a molded foamed plastic material shaped into seat cushion form and having an upper seat surface, a forward edge portion and a recessed lower face upon which the bun is supported upon a support means; and a thin, relatively lightweight, sheet of non-woven randomly oriented fabric formed of linearly oriented polypropylene fibers bonded together with the fibers spread apart sufficiently to form randomly located fine openings therebetween through the sheet, and the sheet being characterized by being relatively smooth surfaced, flexible, but relatively stiff, and stretch resistant in all of its planar directions;

said sheet for reinforcing the foamed plastic material against crumbling and tearing, and being embedded within the shaped foamed plastic material, just above the recessed lower face, the foamed plastic material extending through the random sheet openings and forming a coating over the side of said sheet closer to said recessed lower face, said coating of a thickness roughly around the thickness of the sheet itself.

* * * * *